United States Patent
Shinedling et al.

(10) Patent No.: US 9,868,479 B2
(45) Date of Patent: Jan. 16, 2018

(54) CONFIGURABLE REAR UNDERBODY AERODYNAMIC DIFFUSER

(71) Applicants: Michael M. Shinedling, Oxford, MI (US); Sriram S Pakkam, Royal Oak, MI (US); Jeffrey Reece, Waterford, MI (US)

(72) Inventors: Michael M. Shinedling, Oxford, MI (US); Sriram S Pakkam, Royal Oak, MI (US); Jeffrey Reece, Waterford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/097,887

(22) Filed: Apr. 13, 2016

(65) Prior Publication Data

US 2017/0297637 A1    Oct. 19, 2017

(51) Int. Cl.
*B62D 35/00* (2006.01)
*B62D 37/02* (2006.01)
*B62D 35/02* (2006.01)

(52) U.S. Cl.
CPC ............. *B62D 37/02* (2013.01); *B62D 35/02* (2013.01)

(58) Field of Classification Search
CPC ........ B62D 35/00; B62D 35/02; B62D 37/00; B62D 37/02; B62D 35/005; B62D 35/007; B62D 35/008
USPC .............................. 296/180.1–180.5; 180/913
See application file for complete search history.

(56) References Cited

U.S. PATENT DOCUMENTS

| 4,772,060 A | 9/1988 | Kretschmer |
| 6,575,522 B2 * | 6/2003 | Borghi ................. B62D 35/005 296/180.1 |
| 7,093,889 B2 * | 8/2006 | Graham ................ B60R 19/565 296/180.1 |

(Continued)

FOREIGN PATENT DOCUMENTS

| DE | 102011121407 | 6/2012 |
| EP | 1013540 A2 | 5/2000 |

(Continued)

OTHER PUBLICATIONS https://www.carid.com/rear-diffusers.html, pp. 1-5, published 9 times between Jul. 16, 2015 and Nov. 15, 2016.*

(Continued)

*Primary Examiner* — Dennis H Pedder
(74) *Attorney, Agent, or Firm* — Ralph E Smith

(57) ABSTRACT

Multiple vertical panel strakes extend from a rear underbody of the automobile in a street configuration. Multiple vertical panel extensions include extension coupling elements designed to removably couple the vertical panel extensions to the plurality of vertical strakes in a track configuration. When the rear underbody aerodynamic diffuser is in the street configuration, the plurality of vertical panel extensions are uncoupled from the plurality of vertical panel strakes and the vertical panel strakes have an overall width that extends a vertical street distance. When the rear underbody aerodynamic diffuser is in the track configuration, the plurality of vertical panel extensions are removably coupled to the plurality of vertical panel strakes and the combined vertical panel strakes and vertical panel extensions have an overall width that extends a vertical track distance that is greater than the vertical street distance.

6 Claims, 6 Drawing Sheets

(56) References Cited

U.S. PATENT DOCUMENTS

| | | | |
|---|---|---|---|
| 7,661,753 B2 | 2/2010 | Shinedling et al. | |
| 8,731,781 B2 | 5/2014 | Prentice | |
| 8,882,176 B2* | 11/2014 | Froling | B62D 35/02 296/180.1 |
| 8,926,000 B2* | 1/2015 | del Gaizo | B62D 35/02 296/180.5 |
| 9,139,240 B1* | 9/2015 | Long | B62D 35/001 |
| 2014/0333089 A1* | 11/2014 | Brown | B62D 25/168 296/180.4 |
| 2016/0068202 A1* | 3/2016 | Senatro | B62D 35/001 296/180.4 |

FOREIGN PATENT DOCUMENTS

| | | | |
|---|---|---|---|
| EP | 1477395 A2 | | 11/2004 |
| EP | 2439131 | * | 4/2012 |
| FR | 2363472 | * | 3/1978 |
| FR | 2863244 A1 | | 6/2005 |

OTHER PUBLICATIONS https://web.archive.org/web/20150701000000*/https://www.carid.com/rear-diffusers.html.* http://www.aerosportconcepts.com/about-asc.html, published 8 times between Jan. 9, 2016 and Nov. 18, 2016.* https://web.archive.org/web/*/http://.aerosportconcepts.com/about-asc.html.*

International Search Report and Written Opinion dated Jul. 18, 2017 for International Application No. PCT/US2017/025950, International Filing Date Apr. 4, 2017.

* cited by examiner

CONFIGURABLE REAR UNDERBODY AERODYNAMIC DIFFUSER

FIELD

The present disclosure relates to rear underbody aerodynamic diffusers for generating downforce on an automobile.

BACKGROUND

High performance automobiles use aerodynamic elements to generate downward force (or downforce) on the vehicle to increase contact with the road, and provide increased stability and control. Underbody diffusers are useful in generating such aerodynamic downforce. Such vehicle underbody diffusers use vertical strakes to create airflow channels. Smooth airflow through the channels speeds up as the area increases toward the rear of the vehicle generating downforce on the rear wheels, which are typically the driven wheels of such high performance vehicles.

The smoother the airflow through the channels, the greater the airflow speed through the channels and the greater the resulting downforce that is generated. Vertical strakes that are positioned closer to the road surface are better at limiting turbulent interaction between the channels. Limiting cross channel turbulent airflow is desirable because such cross channel turbulent airflow disrupts the smooth airflow in the channels, which slows airflow speed reducing the resulting downforce.

High performance automobiles are often driven in both public street environments and closed race track environments. For example, it is not uncommon for owners of high performance automobiles to drive these vehicles on public streets and to also periodically race them on closed race tracks. Of course, driving on public streets is not conducive to elements being positioned near public road surfaces, which are often relatively uneven and include relatively large dips and bumps.

Complicated systems have been developed to automatically or dynamically raise and lower underbody panels supporting vertical strakes in order to match driving conditions. Examples of such systems include U.S. Pat. No. 6,575,522, which issued to Borghi et al. on Jun. 10, 2003, and U.S. Pat. No. 8,731,781, which issued to Prentice on May 20, 2014, which are both incorporated herein by reference. Not only are such systems complex, but they are expensive to implement and maintain. In addition, because lowering the underbody panels increases the effective cross-sectional area of the vehicle, such lowering generates increased drag. Indeed, the perceived need to dynamically raise and lower the panels is due, at least in part, to a desire to properly balance downforce and drag under current driving conditions.

SUMMARY

In accordance with one aspect of this disclosure, a rear underbody aerodynamic diffuser for an automobile includes a plurality of vertical panel strakes designed to extend from a rear underbody of the automobile in a street configuration. In addition, a plurality of vertical panel extensions include extension coupling elements designed to removably couple the vertical panel extensions to the plurality of vertical strakes in a track configuration. When the rear underbody aerodynamic diffuser is in the street configuration, the plurality of vertical panel extensions are uncoupled from the plurality of vertical panel strakes and the vertical panel strakes have an overall width that extends a vertical street distance. When the rear underbody aerodynamic diffuser is in the track configuration, the plurality of vertical panel extensions are removably coupled to the plurality of vertical panel strakes and the combined vertical panel strakes and vertical panel extensions have an overall width that extends a vertical track distance that is greater than the vertical street distance.

In accordance with additional aspects, outer pairs of the plurality of vertical panel strakes are coupled together by a joining panel extending substantially orthogonal to the vertical strakes. Each joining panel is designed to be positioned over an open space adjacent a rear wheel of the automobile to increase an area of a smooth bottom surface of the rear underbody. The outer pairs further include strake coupling elements positioned in the joining panel and designed to removably couple the outer pairs to the rear underbody of the automobile.

In accordance with further aspects, an inner pair of the plurality of vertical panel strakes each include an independent flange member extending from a base end of the vertical panel strake. The inner pairs further include strake coupling elements positioned in the independent flange members and designed to removably couple the inner pair to the rear underbody of the automobile.

In accordance with other aspects, the extension coupling elements include threaded members extending through apertures in the vertical panel strakes and the vertical panel extensions. The strake coupling elements include threaded members extending through apertures in flanges of the plurality of vertical panel strakes and into the rear underbody of the automobile.

In accordance with yet other aspects, the plurality of vertical panel strakes are made from a pre-impregnated fiber composite material. The plurality of vertical panel extensions are made from a lower cost material than the pre-impregnated fiber composite material.

DRAWINGS

The present invention will become more fully understood from the detailed description and the accompanying drawings.

DETAILED DESCRIPTION

Figure 1:
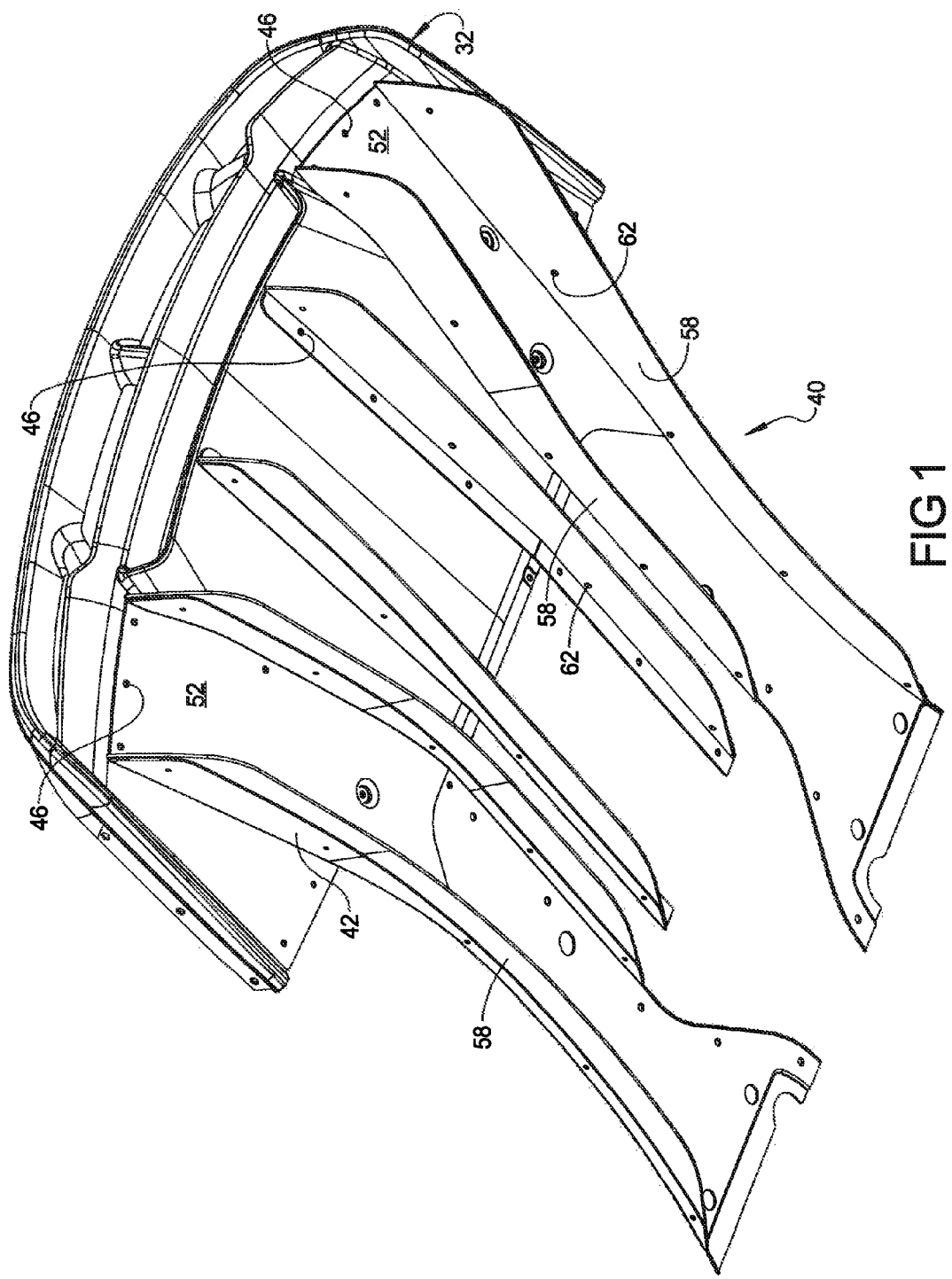
FIG. 1 is an upward perspective view of an exemplary configurable rear underbody aerodynamic diffuser in accordance with the teachings of this disclosure mounted to a rear fascia of an automobile.
Figure 2:
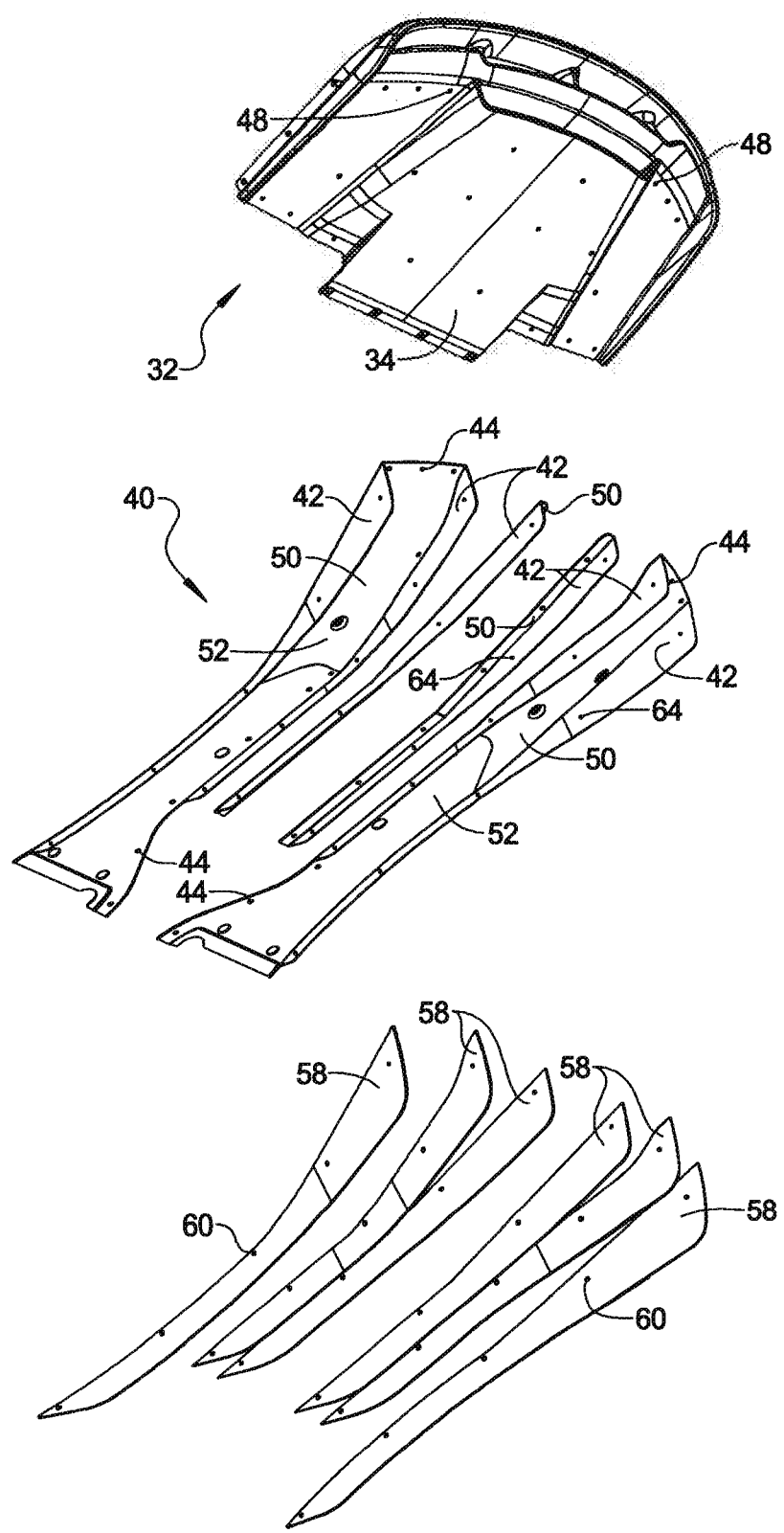
FIG. 2 is an exploded upward perspective view of the exemplary configurable rear underbody aerodynamic diffuser and rear fascia of FIG. 1.
Figure 3:
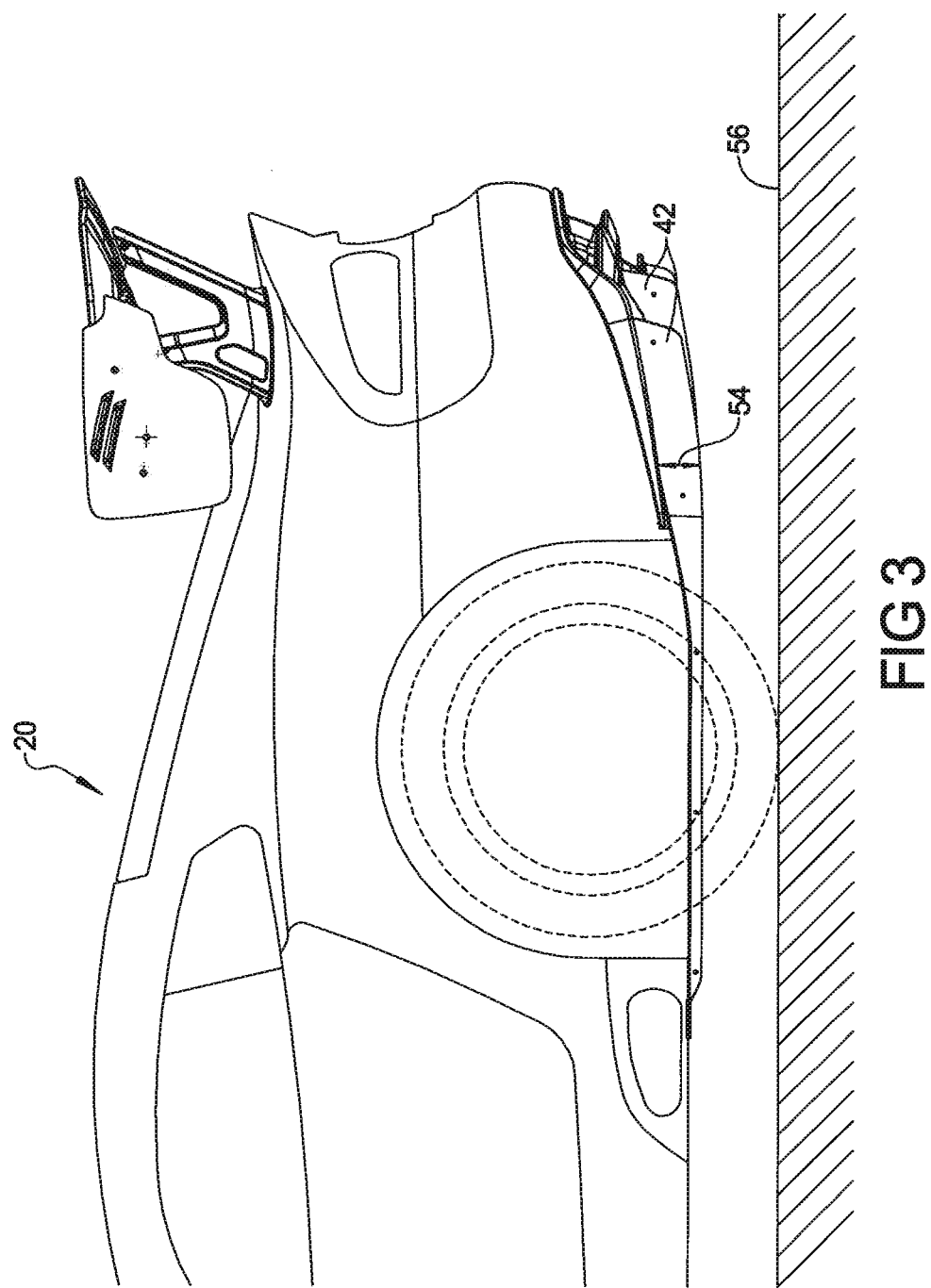
FIG. 3 is a side elevation view of the exemplary configurable rear underbody aerodynamic diffuser of FIG. 1 mounted on an automobile in a street configuration.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

Figure 6:
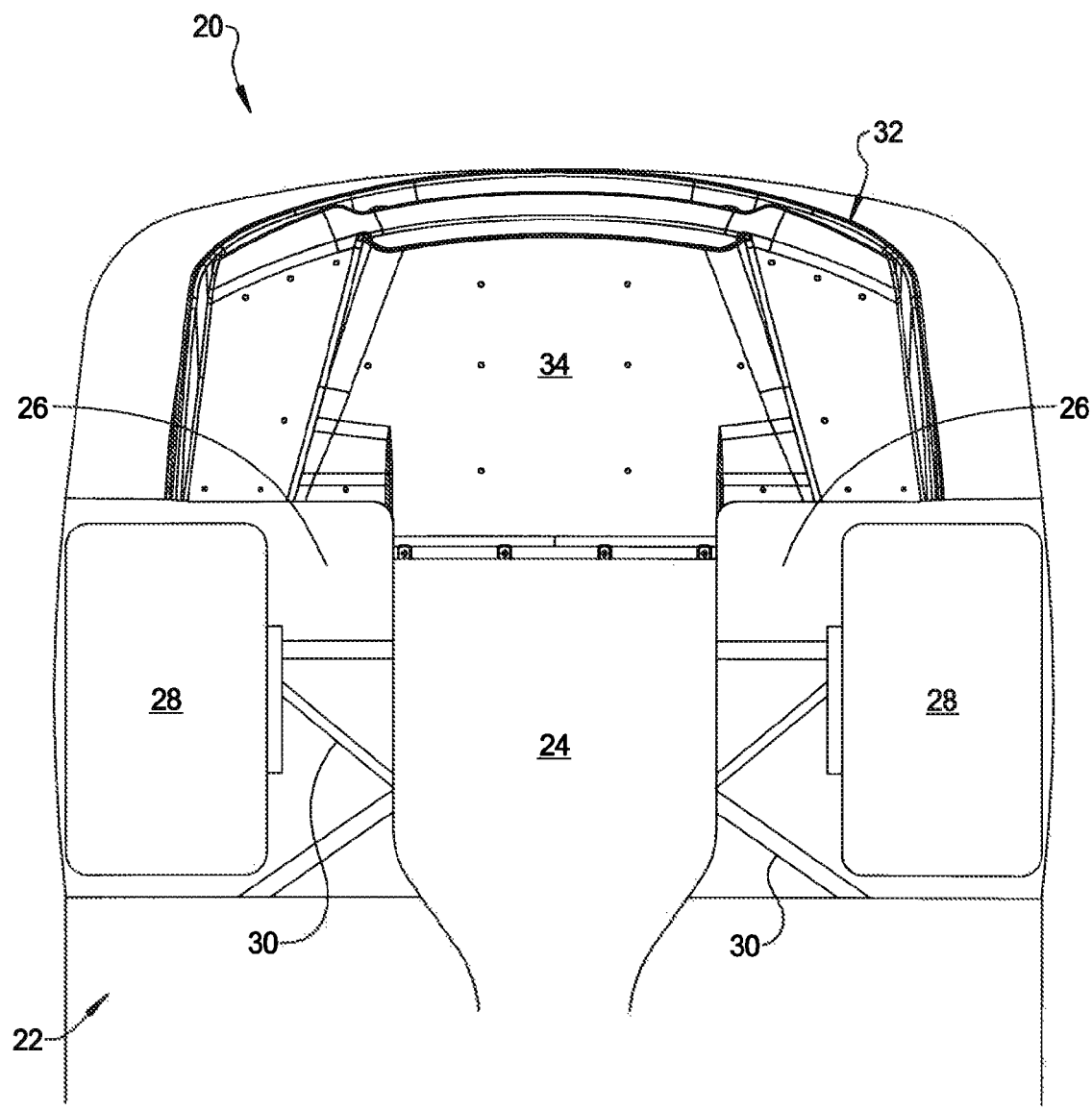
FIG. 6 is a bottom plan view of the underbody of an automobile of FIG. 5, without any components of the exemplary configurable rear underbody aerodynamic diffuser of FIG. 1 mounted thereon.

Referring to FIG. 6, an underside of a rear portion of a high performance automobile 20, without any aerodynamic rear vertical diffuser elements, is illustrated. An underbody 22 includes a central underbody member 24 between two wheel wells 26 for the rear wheels 28. The wheel wells 26 include an open space that exposes vehicle chassis and suspension components 30 between the rear wheels 28 and the central underbody member 24. This open area of the wheel wells 26 with exposed components 30 disrupts airflow under the vehicle 20 that creates undesirable airflow turbulence. A rear fascia 32 includes an extending surface member 34 that operates to extend the central underbody member 24 and serves as an underbody extension member 34.

Referring to FIGS. 1 through 5, one exemplary embodiment of a configurable rear underbody aerodynamic diffuser 40 is illustrated. The configurable diffuser includes base or street vertical panel strakes 42. The illustrated vertical panel strakes 42 are separate, independent elements from any underbody panel; e.g., 34, 24. A flange member 50 extends from a base end of each of the vertical panel strakes 42. In an aspect, the vertical panel strakes 42 include strake coupling elements 44 in the form of coupling apertures 44 extending through the flange members 50. Each outer or outboard pair of the vertical panel strakes 42 share a common flange member 50 in the form of joining panel 52. The inner or inboard pair of vertical panel strakes 42 each include a separate, independent flange member 50.

Figure 5:
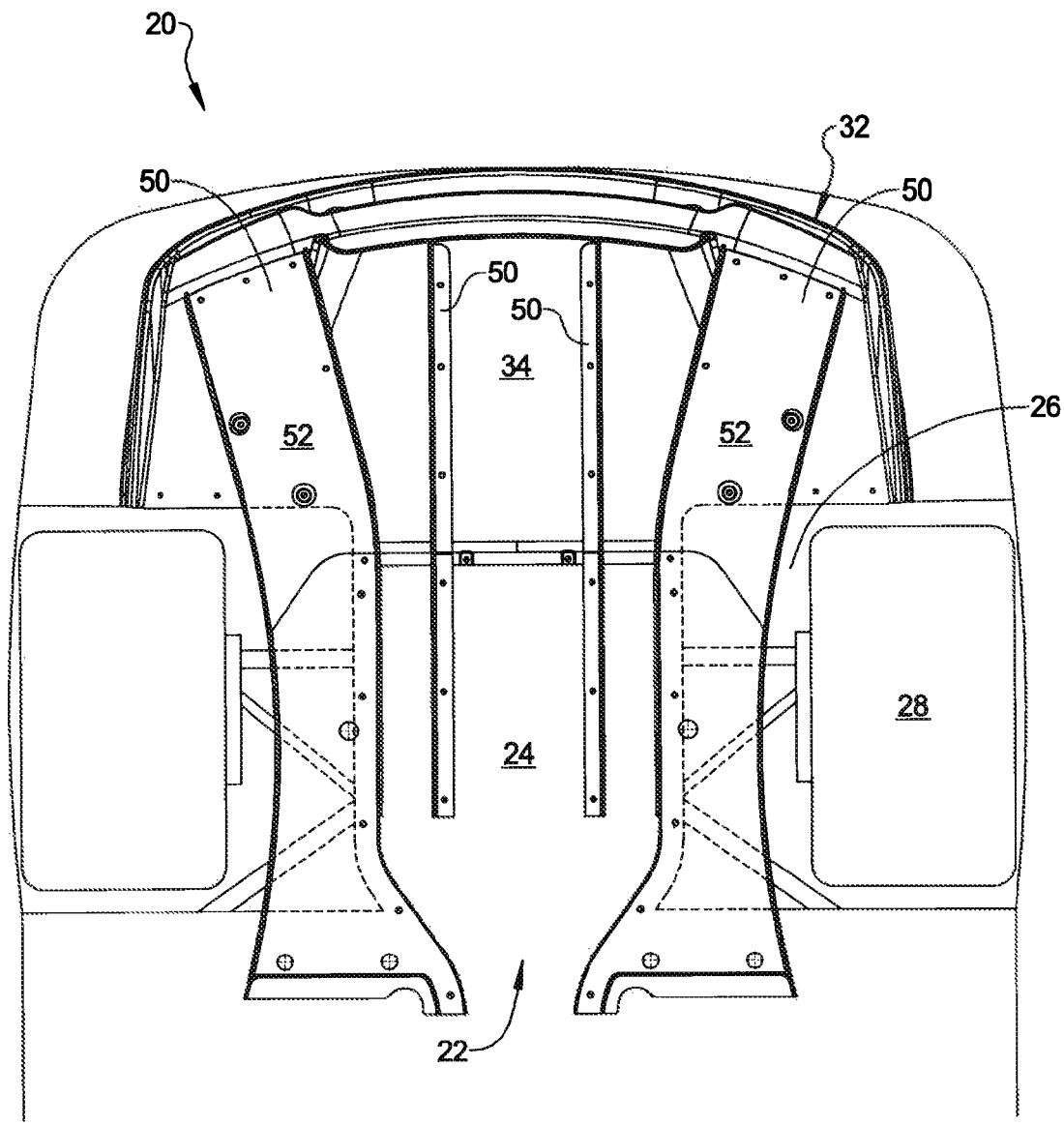
FIG. 5 is a bottom plan view of the exemplary configurable rear underbody aerodynamic diffuser of FIG. 1 mounted on an automobile.

In an aspect, the joining panel 52 between each outboard pair of the vertical panel strakes 42 extends over a portion of the rear wheel wells 26 as shown in FIG. 5. Thus, the joining panels 52 effectively increase the width of the underbody panel 34, or effectively increase the overall area of a smooth bottom surface, including panel 34 and joining panel 52, of the rear underbody of the automobile 20. In an aspect, the joining panels provide smooth airflow channels under an open space of the rear wheel wells 26 or adjacent the rear wheels 28. As should be apparent, such aspects or arrangement reduce unwanted turbulence in the airflow under the automobile, and increases the desired downforce resulting from the rear diffuser 40.

In an aspect, threaded members, such as screws, are provided as cooperating strake coupling elements 46 to releasably couple the vertical panel strakes 42 to the underbody panel elements 24, 34. The threaded cooperating strake coupling elements 46 extend through the strake coupling apertures 44 of the flanges 50 and into corresponding threaded openings 48 of the underbody panel elements 24, 34. In this way, the base or street vertical panel strakes 42 are quickly and easily coupled to, or removed from, the underbody of the automobile 20.

Alternatively, the vertical panel strakes 42 are permanently affixed to one or more underbody panel elements, e.g., 24, 34. For example, the vertical panel strakes 42 are integrally molded as part of one or more single-piece components of an underbody panel; e.g., 34, 24. In other examples, non-releasable fasteners or a permanent adhesive are used to permanently affix the vertical panel strakes 42 to the underbody of the automobile 20.

In an aspect, the base or street vertical panel strakes 42 are formed from a pre-impregnated fiber composite material, such as carbon fiber resin. Such materials are relatively expensive, but are relatively strong and lightweight. As seen in the street configuration of FIG. 3, the vertical panel strakes 42 have an overall width 54 that extends a vertical street distance 54 from the underbody panels 34, 24. The vertical street distance 54 is such that the lower edges of the vertical panel strakes 42 extend at a height and angle above the road surface 56 that is suitable for street driving. In other words, the lower edges of the vertical panel strakes 42 are unlikely to contact the road surface during normal driving on public road surfaces. Thus, it is unlikely the base or street vertical panel strakes 42 would ever be damaged or need to be removed or replaced during normal operation.

In an aspect, should an owner encounter atypical public streets that do result in the base vertical panel strakes 42 contacting the road surface 56 and damaging a vertical panel strake 42, any damaged vertical panel strake 42 are quickly and easily removable and replaceable using the releasable coupling elements 46. In an aspect, such removal and replacement of the damaged vertical strakes 42 does not require replacement of any undamaged strakes 42 or of the underbody panel members 24, 34 to which they are releasable coupled. In a further aspect, the configurable diffuser 40 provides a non-strake configuration, in which neither vertical panel strakes 42 or panel extensions 58 are coupled to the automobile, should an owner frequently encounter such atypical public streets.

The configurable rear underbody aerodynamic diffuser 40 additionally includes panel strake extensions 58 that are releasably or selectively coupled to the vertical panel strakes 42. In an aspect, the vertical panel extensions 58 include extension coupling elements 60 in the form of coupling apertures 60 extending therethrough. Threaded members, such as screws, are provided as cooperating extension coupling elements 62 to releasably couple the vertical panel extensions 42 to the vertical panel strakes 42. The cooperating threaded extension coupling elements 62 extend through the extension coupling apertures 60 and into corresponding threaded openings 64 of the vertical panel strakes 42. In this way, the vertical panel strake extensions 58 are quickly and easily coupleable to, or removable from, the vertical panel strakes 42.

Figure 4:
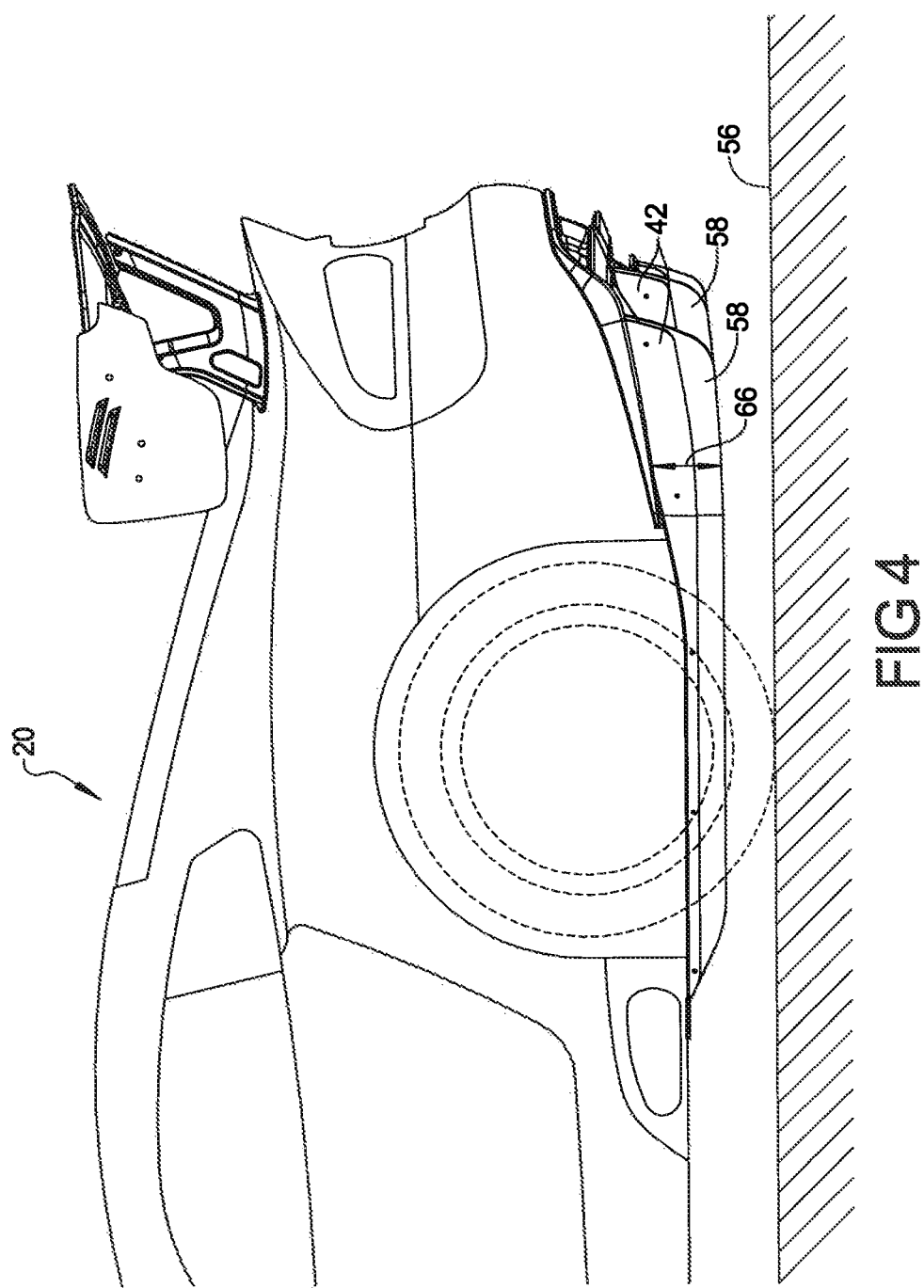
FIG. 4 is a side elevation view of the exemplary configurable rear underbody aerodynamic diffuser of FIG. 1 mounted on an automobile in a track configuration.

As seen in the track configuration of FIG. 4, the combined vertical panel strakes 42 and strake extensions have a combined overall track width 66 that extends a vertical track distance 66 from the adjacent or adjoining underbody panels 24, 34 of the vehicle 20. The overall track width or vertical track distance 66 is greater than the overall street width or vertical street distance 54. Thus, converting the rear diffuser 40 from a road configuration to a track configuration does not require any complicated or costly systems to raise or lower any underbody panels. Rather, in an aspect, the underbody panels 24, 34 to which the rear diffuser 40 is coupled remains stationary relative to the frame or body of the automobile. All that is required is to selectively or releasably couple the panel strake extensions 58 to the base vertical panel strakes 42. In addition, because the underbody panels are not lowered, the effective cross-sectional area of the automobile is not increased, which would increase the drag of such an aerodynamic diffuser.

The greater vertical track distance 66 is such that the lower edges of the vertical panel extensions 58 extend at a lesser height and angle above the road surface 56 that is not suitable for street driving. In other words, the lower edges of the vertical panel extensions 42 are likely to contact the road surface 56 during normal driving on public road surfaces 56. Thus, the vertical track distance 66 is designed and suitable for track racing only.

In track racing, it is desirable that the lower edges of the vertical panel extensions 58 be as close to the road surface 56 as feasible. Thus, it is likely that the vertical panel extensions 58 will periodically strike the road surface 56 during racing. In an aspect, the vertical panel extensions 58 are formed from a relatively low-cost material, such as thermoplastic or thermoset plastics, including very high density polyethylene. Thus, any damaged vertical panel extensions 58 are quickly and easily replaceable without incurring undue costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rear underbody aerodynamic diffuser for a rear underbody of an automobile comprising:
    a plurality of vertical panel strakes designed to extend from a rear underbody of the automobile in a street configuration;
    a plurality of rigid vertical panel extensions comprising extension coupling elements designed to removably couple the vertical panel extensions to the plurality of vertical strakes in a track configuration;
    wherein the rear underbody aerodynamic diffuser is designed to be reconfigurable between the street configuration and the track configuration and vice versa;
    wherein, when the rear underbody aerodynamic diffuser is in the street configuration, the plurality of vertical panel extensions are uncoupled from the plurality of vertical panel strakes and the vertical panel strakes have an overall width that extends a vertical street distance; and
    wherein, when the rear underbody aerodynamic diffuser is in the track configuration, the plurality of vertical panel extensions are removably coupled to the plurality of vertical panel strakes and the combined vertical panel strakes and vertical panel extensions have an overall width that extends a vertical track distance that is greater than the vertical street distance.

2. The rear underbody aerodynamic diffuser of claim 1, wherein outer pairs of the plurality of vertical panel strakes are coupled together by a joining panel extending substantially orthogonal to the vertical strakes, and each joining panel is designed to be positioned over an open space adjacent a rear wheel of the automobile to increase an area of a smooth bottom surface of the rear underbody, and the outer pairs further comprise strake coupling elements positioned in the joining panel and designed to removably couple the outer pairs to the rear underbody of the automobile.

3. The rear underbody aerodynamic diffuser of claim 1, wherein an inner pair of the plurality of vertical panel strakes each comprise an independent flange member extending from a base end of the vertical panel strake, and the inner pairs further comprise strake coupling elements positioned in the independent flange members and designed to removably couple the inner pair to the rear underbody of the automobile.

4. The rear underbody aerodynamic diffuser of claim 1, wherein the plurality of vertical panel strakes each comprise a flange member extending from a base end of the vertical panel strake, and the strake coupling elements include threaded members extending through apertures in the flange members and into the rear underbody of the automobile.

5. The rear underbody aerodynamic diffuser of claim 1, wherein the extension coupling elements comprise threaded members extending through apertures in the vertical panel strakes and the vertical panel extensions.

6. The rear underbody aerodynamic diffuser of claim 1, wherein the plurality of vertical panel strakes comprise a pre-impregnated fiber composite material, and the plurality of vertical panel extensions comprise a lower cost material than the pre-impregnated fiber composite material.

\* \* \* \* \*